United States Patent
Li et al.

(10) Patent No.: US 8,599,754 B2
(45) Date of Patent: Dec. 3, 2013

(54) METHOD, DEVICE, AND SYSTEM FOR CONFIGURING MULTICAST BROADCAST SINGLE FREQUENCY NETWORK RESOURCES

(75) Inventors: Bingzhao Li, Beijing (CN); Bo Lin, Beijing (CN); Boya Lv, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 343 days.

(21) Appl. No.: 13/050,147

(22) Filed: Mar. 17, 2011

(65) Prior Publication Data

US 2011/0199973 A1 Aug. 18, 2011

Related U.S. Application Data

(63) Continuation of application No. PCT/CN2009/074010, filed on Sep. 17, 2009.

(30) Foreign Application Priority Data

Sep. 18, 2008 (CN) .......................... 2008 1 0161210

(51) Int. Cl.
H04W 4/00 (2009.01)
(52) U.S. Cl.
USPC ........ 370/328; 455/422.1; 455/450; 709/208; 709/221
(58) Field of Classification Search
None
See application file for complete search history.

(56) References Cited

U.S. PATENT DOCUMENTS

| | | | |
|---|---|---|---|
| 2004/0085926 A1* | 5/2004 | Hwang et al. | 370/328 |
| 2006/0146745 A1* | 7/2006 | Cai et al. | 370/328 |
| 2007/0042794 A1* | 2/2007 | Fischer | 455/466 |
| 2009/0147717 A1* | 6/2009 | Cai | 370/312 |
| 2010/0113056 A1 | 5/2010 | Chen et al. | |
| 2011/0085488 A1* | 4/2011 | Widegren | 370/312 |

FOREIGN PATENT DOCUMENTS

| | | |
|---|---|---|
| CN | 1678059 | 10/2005 |
| CN | 101043641 | 9/2007 |
| CN | 102237276 | 8/2008 |
| CN | 101262277 | 9/2008 |
| CN | 101272518 | 9/2008 |
| CN | 101500191 | 8/2009 |
| CN | 101605041 | 4/2011 |

OTHER PUBLICATIONS

International Search Report, mailed Dec. 24, 2009, in corresponding International Application No. PCT/CN2009/074010 (4 pp.).

(Continued)

*Primary Examiner* — Brian Roberts
(74) *Attorney, Agent, or Firm* — Staas & Halsey LLP

(57) ABSTRACT

In the field of mobile communication, a method, device, and system for configuring multicast broadcast single frequency network (MBSFN) resources are provided, so as to solve the problem that configuration information of each radio network controller (RNC) in an MBSFN cannot be dynamically synchronized. With the coordination of a master RNC, a multimedia broadcast multicast service (MBMS) configuration information message is transferred through IUR interface connection, and MBMS configuration information of the master RNC and each slave RNC is synchronized. In this way, the problem that configuration information of each RNC in an MBSFN cannot be dynamically synchronized is solved, thereby satisfying the demands of soft combing and air interface combining.

13 Claims, 3 Drawing Sheets

(56) References Cited

OTHER PUBLICATIONS

3$^{rd}$ *Generation Partnership Project*; Technical Specification Group Radio Access Network; Introduction of the Multimedia Broadcast Multicast Service (MBMS) in the Radio Access Network (RAN); Stage 2 (Release 8), 3GPP TS 25.346 V8.1.0, Mar. 2008, pp. 1-64.

Written Opinion of the International Searching Authority, mailed Dec. 24, 2009, in International Application No. PCT/CN2009/074010 (3 pp.).

Office Action, mailed Mar. 29, 2010, in Chinese Application No. 200810161210.3 (9 pp.).

\* cited by examiner

METHOD, DEVICE, AND SYSTEM FOR CONFIGURING MULTICAST BROADCAST SINGLE FREQUENCY NETWORK RESOURCES

CROSS-REFERENCE TO RELATED APPLICATIONS

This application is a continuation of International Application No. PCT/CN2009/074010, filed on Sep. 17, 2009, which claims priority to Chinese Patent Application No. 200810161210.3, filed on Sep. 18, 2008, both of which are hereby incorporated by reference in their entireties.

FIELD OF THE TECHNOLOGY

The present invention relates to the mobile communication field, and more particularly to a method, a device, and a system for configuring multicast broadcast single frequency network (MBSFN) resources.

BACKGROUND OF THE INVENTION

The Multimedia Broadcast Multicast Service (MBMS) is an important aspect in the service development of the 3rd Generation Partnership Project (3GPP). In the MBMS, the same multimedia service data is sent to a plurality of receivers in the network at the same time on the network side. As for the MBMS service based on High Speed Packet Access (HSPA+) architecture, the network side needs to transmit the same MBMS data in a plurality of cells at the same time and strictly performs synchronous transmission in the same encoding mode, so that a User Equipment (UE) can regard signals from different cells as different multi-path components of one signal, perform air interface combining and soft combining by using a multi-path diversity (RAKE) receiver, and combine service data from the plurality of cells at a physical layer, thereby achieving the effects of enhancing the receiving performance and improving the user satisfaction.

To implement the air interface combining and the soft combining, the synchronization of MBMS configuration information between radio network controllers (RNCs) must be guaranteed. In a flat network, an evolved base station (NODEB+) is equivalent to the combination of an RNC and a conventional base station (NODEB) in the conventional network. That is, the NODEB+ has the function of the RNC. Therefore, the RNC in the present invention may not only be an RNC in the conventional network but also be an RNC in the NODEB+ in the flat network.

In the prior art, as shown in FIG. 1, RNCs are connected through IUR interfaces, and each of the RNCs determines its own MBMS configuration information and then maintains consistency of configuration information between adjacent RNCs by transferring the configuration information message through the IUR interfaces. The architecture solves the problem of user plane data synchronization on the MBMS point-to-multipoint traffic channel (MTCH), and implements resource coordination of a control plane through communication between the RNCs on a signaling plane, so as to meet the requirements of soft combining to some extent.

The inventors find that, in the process for implementing the synchronization of configuration information, the consistency between the mapping of the RNCs cannot be guaranteed when a plurality of MBMS services are mapped to a plurality of Secondary Common Control Physical Channels (S-CCPCHs). Because the mapping relationship is generated dynamically, it is possible that the same MBMS service is mapped differently to S-CCPCHs on different RNCs, resulting in failure of the soft combining and air interface combining.

Further, in the MBSFN, it is difficult to synchronize scheduling information of an MBMS point-to-multipoint control channel (MCCH). Because it is difficult to predefine the sequence of messages sent on the MCCH for each of the RNCs, synchronous transmission cannot be implemented on the MCCH.

Currently, in the MBSFN, the air interface combining can be implemented only when the MCCH configuration of the RNCs is completely consistent. However, under the current architecture, the synchronization of MCCH configuration information of the different RNCs can be implemented only through static pre-configuration by OM. If the MCCH configuration information changes, dynamic synchronization of the MCCH configuration information of the RNCs cannot be implemented.

SUMMARY OF THE INVENTION

The embodiments of the present invention provide a method, a device, and a system for configuring MBSFN resources, so as to achieve dynamic synchronization of MBMS configuration information of RNCs in the MBSFN.

In order to achieve the foregoing objective, embodiments of the present invention provide the following technical solutions.

The present invention provides a method for configuring MBSFN resources, which includes:

One of the RNCs serves as a master RNC, and other RNCs serve as slave RNCs.

The master RNC generates an MBMS configuration information message.

The master RNC sends the MBMS configuration information message to the slave RNCs.

The present invention further provides a master RNC, which includes a configuration information message generating module and a master sending module.

The configuration information message generating module is configured to generate an MBMS configuration information message.

The master sending module is configured to send the MBMS configuration information message to slave RNCs.

The present invention further provides a slave RNC, which includes a receiving module and a control channel establishing module.

The receiving module is configured to receive an MBMS configuration information message generated and sent by a master RNC.

The control channel establishing module is configured to establish a point-to-multipoint control channel according to the MBMS configuration information message.

The present invention further provides a system for configuring MBSFN resources, which includes at least two RNCs.

One of the RNCs serves as a master RNC, and other RNCs serve as slave RNCs.

The master RNC is configured to generate an MBMS configuration information message and send the generated MBMS configuration information message to the slave RNCs.

The slave RNC is configured to receive the MBMS configuration information message sent by the master RNC, and establish a point-to-multipoint control channel according to the MBMS configuration information message.

The embodiments of the present invention introduce concepts of master node and slave node on a control plane. An MBSFN region includes one master RNC and several slave RNCs, and the master RNC and the slave RNCs are connected through IUR interfaces. The master RNC generates an MBMS configuration information message, transfers the MBMS configuration information message through IUR interface connection, and synchronizes MBMS configuration information between the master RNC and each of the slave RNCs. In this way, the problem that the MBMS configuration information of the RNCs in the MBSFN cannot be dynamically synchronized is solved, thereby satisfying the demands of soft combing and air interface combining.

DETAILED DESCRIPTION OF THE EMBODIMENTS

The present invention provides a method for configuring MBSFN resources, so that MBMS configuration information of RNCs in an MBSFN can be synchronized dynamically.

Figure 1:
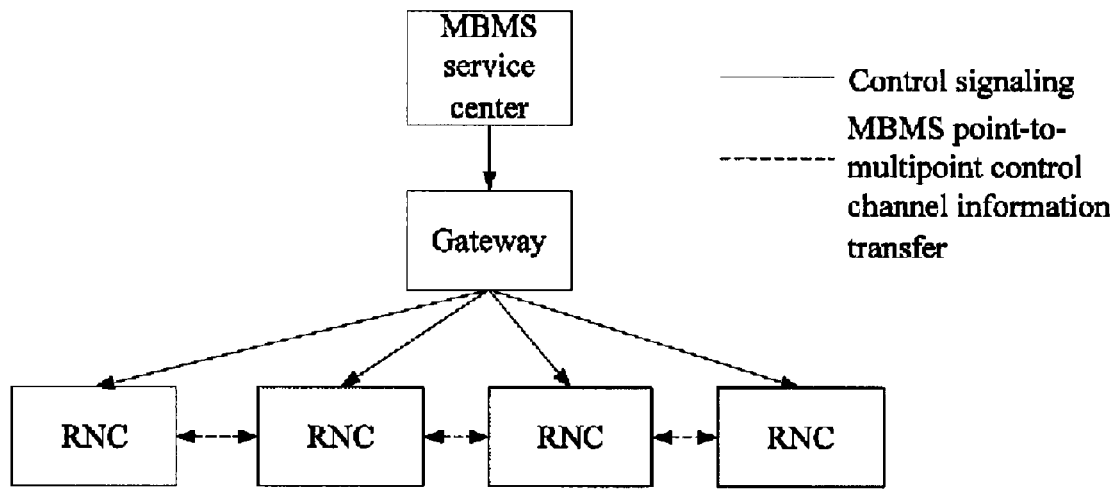
FIG. 1 is a structural view of implementing MCCH configuration information synchronization between RNCs in the prior art.
Figure 2:
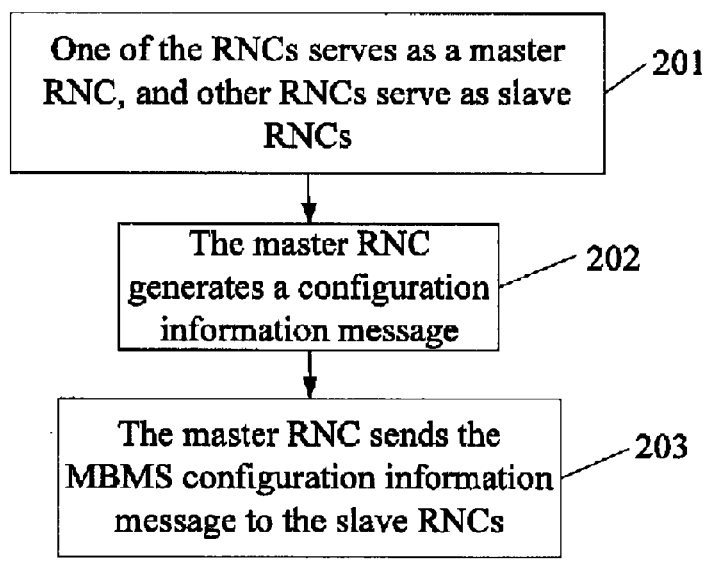
FIG. 2 is a flow chart of a method for configuring MBSFN resources according to an embodiment of the present invention.

As shown in FIG. 2, the method for configuring MBSFN resources includes the following steps:

Step 201: One of the RNCs serves as a master RNC and other RNCs serve as slave RNCs.

The MBSFN has more than two RNCs. According to the embodiments of the present invention, one RNC may be randomly selected as a master RNC, and other RNC or RNCs serve as slave RNC(s). In the embodiments of the invention, slave RNC(s) or a slave RNC means one or more slave RNCs. An MBSFN includes a master RNC and several slave RNCs, and the master RNC and the slave RNCs are connected through IUR interfaces.

Step 202: The master RNC generates an MBMS configuration information message.

The master RNC generates an MBMS configuration information message, which includes configuration information of a point-to-multipoint control channel in the MBSFN, and content and sequence of a message or messages to be transferred on the point-to-multipoint control channel.

Step 203: The master RNC sends the MBMS configuration information message to the slave RNCs.

The master RNC encodes the MBMS configuration information message according to a radio resource control protocol, and sends the message to each slave RNC in the form of bit stream through the IUR interfaces.

After the slave RNCs receive the MBMS configuration information message, the master and slave RNCs send the MBMS configuration information message to a user together. Before the message is sent to the user, the initial timing of the scheduling period of the master RNC and each slave RNC needs to be synchronized. In this way, it can be guaranteed that the master and slave RNCs send the MBMS configuration information message to the user at the same time. The scheduling period includes a repetition period and a modification period. In the repetition period, the RNCs repeatedly send an MCCH message in the MBMS configuration information message to the user. When the MBMS configuration information changes, the RNCs send the MCCH message in the changed MBMS configuration information message to the user within the modification period. In order to guarantee the synchronous transmission of the MBMS configuration information between the master RNC and each slave RNC, the synchronization of the scheduling period between the master RNC and each slave RNC should be firstly guaranteed.

In each RNC, time is measured by SFN number. The SFN represents a time within an RNC. As long as SFN numbers of the master RNC and each slave RNC are aligned, the initial position alignment of the scheduling period within each RNC can be achieved. The initial SFN number of the scheduling period satisfies the condition that SFN mod 2(m−r)=0, where m denotes a modification period coefficient and r denotes a repetition period coefficient. Once the repetition period and the modification period are determined, m and r can be determined accordingly and the initial SFN of the scheduling period is also determined. In this way, the initial timing alignment of the scheduling period within each RNC can be implemented by aligning the SFN numbers of the master RNC and each slave RNC. Afterwards, the SFN numbers of the master RNC and each slave RNC need to be synchronized. The SFN number alignment of the master RNC and each slave RNC can be implemented by adding a GPS clock on the master RNC and each slave RNC. The synchronization of a modification period and an access period of each RNC can be implemented by using the same method. In this way, the master RNC and each slave RNC can keep synchronous in sending configuration information.

If the configuration information changes, the RNCs send the changed MCCH message to the user at the start of the modification period of the next scheduling period.

After receiving the encoded bit stream transmitted by the master RNC, each slave RNC decodes the bit stream, obtains the MBMS configuration information message, and obtains MBMS configuration information according to the MBMS configuration information message. According to the MBMS configuration information, each slave RNC configures its MCCH channel, updates system information broadcast, configures its MTCH parameters of each layer such as radio link control (RLC) protocol layer, media access control (MAC) protocol layer, and physical (PHY) layer, and sends the MCCH message to the user through the air interface according to the sequence of the MCCH message received from the master RNC, at the start of the next modification period. Afterwards, service data can be transmitted by correlating the user data stream and the corresponding radio bearer according to the mapping relationship of the radio bearer and the service designated in the MBMS configuration information.

Because the MBMS configuration information message is transmitted between the master RNC and the slave RNCs through IUR interfaces, more RJR interfaces may be required when the number of the slave RNCs is large. In order to reduce the number of the IUR interfaces, an IP multicasting mode can be employed to implement the transfer of the MBMS configuration information message between the master and slave RNCs. The IP multicasting transmits an IP packet to a set of hosts of a multicast group according to a specific IP multicast address based on a maximum delivery principle. The basic method is as follows. When someone sends data to a group of persons, he does not need to send the data to each person and only needs to send the data to certain reserved multicast address, and all the persons joining the group can receive the data. Accordingly, the sender only needs to send the data for once to send the data to all the receivers, which significantly reduces the network load and the burden of the sender. In the embodiments of the present invention, an IP multicast address is configured for the RNCs in the SFN area, the multicasting function is performed by an IP layer multicast module of the master RNC, and the MBMS configuration information message is sent to the multicast address. With such multicast implementation, the master RNC can send the MBMS configuration information message to each slave RNC by using one IUR interface.

Because the MBMS configuration information message is generated by the master RNC, the master RNC designates the mapping relationship between the MBMS services and the S-CCPCHs, and notifies each slave RNC. In this way, the consistency of the mapping relationship between the MBMS services and the S-CCPCHs within the MBSFN can be guaranteed.

The embodiments of the present invention introduce concepts of master node and slave node on a control plane. An MBSFN region is formed by one master RNC and several slave RNCs, and the master RNC and each of the slave RNCs are connected through IUR interfaces. The master RNC generates an MBMS configuration information message, transfers the MBMS configuration information message through IUR interface connection, and synchronizes MBMS configuration information between the master RNC and each slave RNC. In this way, the problem that the MBMS configuration information of the RNCs in the MBSFN cannot be dynamically synchronized is solved, thereby satisfying the demands of soft combing and air interface combining.

In an embodiment, the present invention further provides a master RNC.

Figure 3:
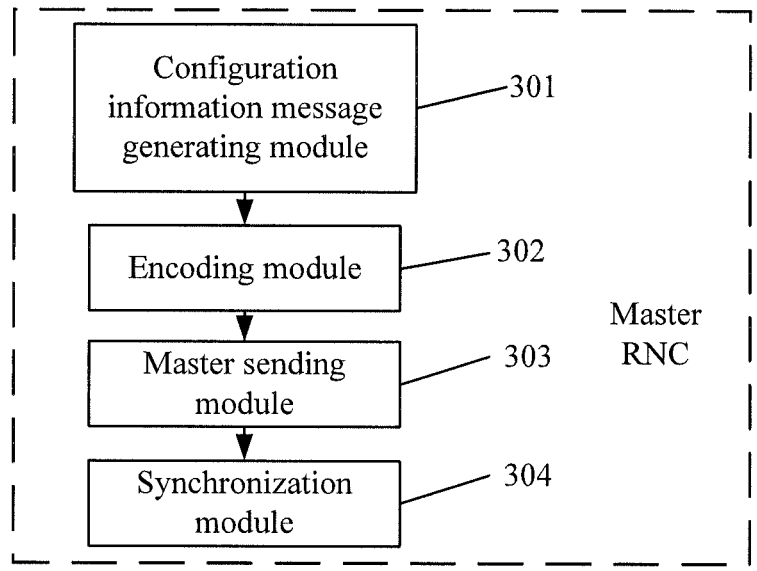
FIG. 3 is a block diagram of the structure of a master RNC according to an embodiment of the present invention.

As shown in FIG. 3, the master RNC includes a configuration information message generating module 301, an encoding module 302, a master sending module 303, and a synchronization module 304.

The configuration information message generating module 301 is configured to generate an MBMS configuration information message.

The master RNC generates an MBMS configuration information message, which includes configuration information of a point-to-multipoint control channel in the MBSFN, and content and sequence of messages transferred on the point-to-multipoint control channel.

The encoding module 302 is configured to encode the MBMS configuration information message.

The master RNC encodes the MBMS configuration information message according to a radio resource control protocol, and sends the MBMS configuration information message to each slave RNC in the form of a bit stream through IUR interfaces.

The master sending module 303 is configured to send the MBMS configuration information message to the slave RNCs.

The master RNC sends the encoded MBMS configuration information message to each slave RNC in the form of bit stream through the IUR interfaces.

If the MBMS configuration information changes, the master RNC generates a corresponding MBMS configuration information message, and sends the changed MBMS configuration information message to each slave RNC.

The synchronization module 304 is configured to synchronize initial timing of scheduling periods of the master RNC and the slave RNCs.

After the slave RNCs receive the MBMS configuration information message, the master and slave RNCs send the MBMS configuration information message to a user together. Before the message is sent to the user, initial timing of scheduling periods of the master RNC and each slave RNC needs to be synchronized. In this way, it can be guaranteed that the master and slave RNCs send the MBMS configuration information message to the user at the same time. The scheduling period includes a repetition period and a modification period. In the repetition period, the RNCs repeatedly send an MCCH message in the MBMS configuration information message to the user. When the MBMS configuration information changes, the RNCs send the MCCH message in the changed MBMS configuration information message to the user within the modification period. In order to guarantee the synchronous transmission of the MBMS configuration information between the master RNC and each slave RNC, the synchronization of the scheduling period between the master RNC and each slave RNC should be firstly guaranteed.

In each RNC, time is measured by using SFN number. The SFN represents a time within an RNC. As long as SFN numbers of the master RNC and each slave RNC are aligned, the initial position alignment of the scheduling period within each RNC can be achieved. The initial SFN number of the scheduling period satisfies the condition that SFN mod $2(m-r)=0$, where in denotes a modification period coefficient and r denotes a repetition period coefficient. Once the repetition period and the modification period are determined, m and r can be determined correspondingly and the initial SFN of the scheduling period is also determined. In this way, the initial timing alignment of the scheduling period within each RNC can be implemented by aligning the SFN numbers of the master RNC and each slave RNC. Afterwards, the SFN numbers between the master RNC and each slave RNC need to be synchronized. The SFN number alignment of the master RNC and each slave RNC can be implemented by adding a GPS clock on the master RNC and each slave RNC. The synchronization of a modification period and an access period of each RNC can be implemented by using the same method. In this way, the master RNC and each slave RNC can keep synchronous in sending the MBMS configuration information.

If the MBMS configuration information changes, the RNCs send the changed MBMS configuration information message to the user at the start of the modification period of a next scheduling period.

In an embodiment, the present invention further provides a slave RNC.

Figure 4:
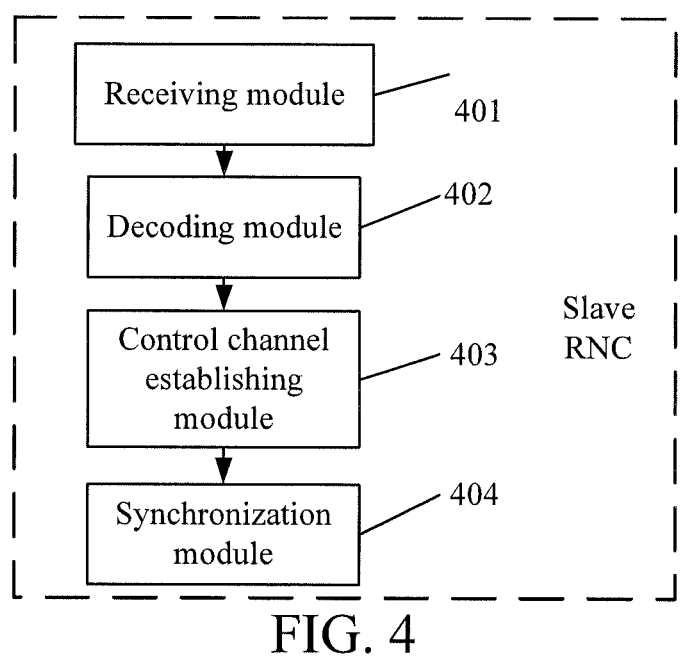
FIG. 4 is a block diagram of the structure of a slave RNC according to an embodiment of the present invention.

As shown in FIG. 4, the slave RNC includes a receiving module 401, a decoding module 402, a control channel establishing module 403, and a synchronization module 404.

The receiving module 401 is configured to receive an MBMS configuration information message generated and sent by a master RNC.

The slave RNC receives the encoded MBMS configuration information message transferred by the master RNC.

The decoding module 402 is configured to decode the MBMS configuration information message.

The slave RNC obtains an MBMS configuration information message before the encoding by decoding the MBMS configuration information message.

The control channel establishing module 403 is configured to establish a point-to-multipoint control channel according to the MBMS configuration information message.

The slave RNC obtains the MBMS configuration information message, and obtains MBMS configuration information according to the message. According to the MBMS configuration information, each slave RNC configures its MCCH channel, updates system information broadcast, configures its MTCH parameters of each layer such as a radio link control (RLC) protocol layer, a media access control (MAC) protocol layer, and a physical (PHY) layer, and sends the MCCH message to the user through an air interface according to a sequence of the MCCH message received from the master RNC, at the start of the next modification period. Afterwards, service data can be transmitted by correlating a user data stream and a corresponding radio bearer according to the mapping relationship of the radio bearer and the service designated in the MBMS configuration information.

The synchronization module 404 is configured to synchronize initial timing of scheduling periods of the master RNC and the slave RNC.

After the slave RNC receives the MBMS configuration information message, the master and slave RNCs send the MBMS configuration information message to a user together. Before the message is sent to the user, initial timing of scheduling periods of the master RNC and each slave RNC needs to be synchronized. In this way, it can be guaranteed that the master and slave RNCs send the MBMS configuration information message to the user at the same time. The scheduling period includes a repetition period and a modification period. In the repetition period, the RNCs repeatedly send an MCCH message in the MBMS configuration information message to the user. When the MBMS configuration information changes, the RNCs send the MCCH message in the changed MBMS configuration information message to the user within the modification period. In order to guarantee the synchronous transmission of the MBMS configuration information between the master RNC and each slave RNC, the synchronization of the scheduling period between the master RNC and each slave RNC should be firstly guaranteed.

In each RNC, time is measured by using an SFN number. The SFN represents a time within an RNC. As long as SFN numbers of the master RNC and each slave RNC are aligned, the initial position alignment of the scheduling period within each RNC can be achieved. The initial SFN number of the scheduling period satisfies the condition that SFN mod $2(m-r)=0$, where m denotes a modification period coefficient and r denotes a repetition period coefficient. Once the repetition period and the modification period are determined, m and r can be determined correspondingly and the initial SFN of the scheduling period is also determined. In this way, the initial position alignment of the scheduling period within each RNC can be implemented by aligning the SFN numbers of the master RNC and each slave RNC. Afterwards, the SFN numbers between the master RNC and each slave RNC need to be synchronized. The SFN number alignment of the master RNC and each slave RNC can be implemented by adding a GPS clock on the master RNC and each slave RNC. The synchronization of a modification period and an access period of each RNC can be implemented by using the same method. In this way, the master RNC and each slave RNC can keep synchronous in sending the MBMS configuration information.

If the configuration information changes, the RNCs send the changed MBMS configuration information message to the user at the start of the modification period of a next scheduling period.

In an embodiment, the present invention further provides a system for configuring MBSFN resources.

The system for configuring MBSFN resources includes at least two RNCs, in which the RNCs are connected to each other through IUR interfaces, one of the RNCs serves as a master RNC, and other RNCs serve as slave RNCs. An MBSFN is formed by one master RNC and several slave RNCs.

Figure 5:
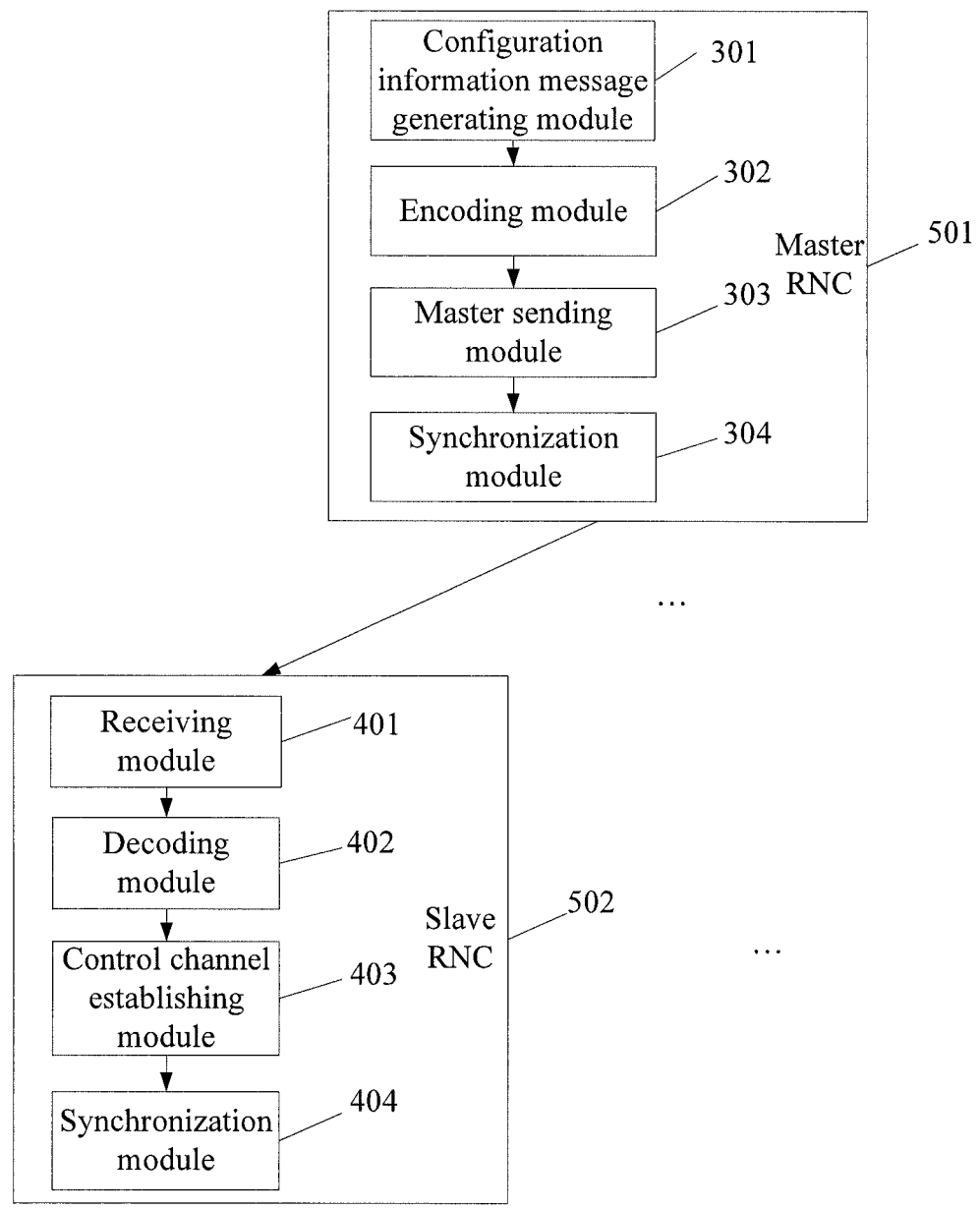
FIG. 5 is a block diagram of a system for configuring MBSFN resources according to an embodiment of the present invention.

As shown in FIG. 5, the system for configuring MBSFN resources includes a master RNC 501 and a slave RNC 502.

The master RNC 501 is configured to generate an MBMS configuration information message, and send the generated MBMS configuration information message to the slave RNCs.

The master RNC 501 includes a configuration information message generating module 301, an encoding module 302, a master sending module 303, and a synchronization module 304.

The configuration information message generating module 301 is configured to generate an MBMS configuration information message.

The master RNC generates an MBMS configuration information message, which includes configuration information of a point-to-multipoint control channel in the MBSFN and content and sequence of messages transferred on the point-to-multipoint control channel.

The encoding module 302 is configured to encode the MBMS configuration information message.

The master RNC encodes the MBMS configuration information message according to a radio resource control protocol, and sends the message to each slave RNC in the form of a bit stream through IUR interfaces.

The master sending module 303 is configured to send the MBMS configuration information message to the slave RNCs.

The master RNC sends the encoded MBMS configuration information message to each slave RNC in the form of a bit stream through the IUR interfaces.

If the MBMS configuration information changes, the master RNC generates a corresponding MBMS configuration information message, and sends the changed MBMS configuration information message to each slave RNC.

The synchronization module 304 is configured to synchronize initial timing of scheduling periods of the master RNC and the slave RNCs.

After the slave RNCs receive the MBMS configuration information message, the master and slave RNCs send the MBMS configuration information message to a user together. Before the message is sent to the user, initial timing of scheduling periods of the master RNC and each slave RNC needs to be synchronized. In this way, it can be guaranteed that the master and slave RNCs send the MBMS configuration information message to the user at the same time. The scheduling period includes a repetition period and a modification period. In the repetition period, the RNCs repeatedly send an MCCH message in the MBMS configuration information message to the user. When the MBMS configuration information changes, the RNCs send the MCCH message in the changed MBMS configuration information message to the user within the modification period. In order to guarantee the synchronous transmission of the MBMS configuration information between the master RNC and each slave RNC, the synchronization of the scheduling period between the master RNC and each slave RNC should be firstly guaranteed.

In each RNC, time is measured by using an SFN number. The SFN represents a time within an RNC. As long as SFN numbers of the master RNC and each slave RNC are aligned, the initial position alignment of the scheduling period within each RNC can be achieved. The initial SFN number of the scheduling period satisfies the condition that SFN mod $2(m-r)=0$, where m denotes a modification period coefficient and r denotes a repetition period coefficient. Once the repetition period and the modification period are determined, m and r can be determined correspondingly and the initial SFN of the scheduling period is also determined. In this way, the initial position alignment of the scheduling period within each RNC can be implemented by aligning the SFN numbers of the master RNC and each slave RNC. Afterwards, the SFN numbers between the master RNC and each slave RNC need to be synchronized. The SFN number alignment of the master RNC and each slave RNC can be implemented by adding a GPS clock on the master RNC and each slave RNC. The synchronization of a modification period and an access period of each RNC can be implemented by using the same method. In this way, the master RNC and each slave RNC can keep synchronous in sending configuration information.

If the MBMS configuration information changes, the RNCs send the changed MBMS configuration information message to the user at the start of the modification period of a next scheduling period.

The slave RNC 502 is configured to receive the MBMS configuration information message sent by the master RNC, and establish a point-to-multipoint control channel according to the MBMS configuration information message.

The slave RNC 502 includes a receiving module 401, a decoding module 402, a control channel establishing module 403, and a synchronization module 404.

The receiving module 401 is configured to receive the MBMS configuration information message.

The receiving module 401 receives the encoded MBMS configuration information message transferred by the master RNC.

The decoding module 402 is configured to decode the MBMS configuration information message.

The decoding module 402 obtains an MBMS configuration information message before the encoding by decoding the MBMS configuration information message.

The control channel establishing module 403 is configured to establish a point-to-multipoint control channel according to the MBMS configuration information message.

The slave RNC obtains the MBMS configuration information message, and obtains MBMS configuration information according to the message. According to the MBMS configuration information, each slave RNC configures its MCCH channel, updates system information broadcast, configures its MTCH parameters of each layer such as a radio link control (RLC) protocol layer, a media access control (MAC) protocol layer, and a physical (PHY) layer, and sends the MCCH message to the user through an air interface according to a sequence of the MCCH message received from the master RNC, at the start of the next modification period. Afterwards, service data can be transmitted by correlating a user data stream and a corresponding radio bearer according to the mapping relationship of the radio bearer and the service designated in the MBMS configuration information.

The synchronization module 404 is configured to synchronize initial timing of scheduling periods of the master RNC and the slave RNC.

After the slave RNC receives the MBMS configuration information message, the master and slave RNCs send the MBMS configuration information message to a user together. Before the message is sent to the user, initial timing of scheduling periods of the master RNC and each slave RNC needs to be synchronized. In this way, it can be guaranteed that the master and slave RNCs send the MBMS configuration information message to the user at the same time. The scheduling period includes a repetition period and a modification period. In the repetition period, the RNCs repeatedly send an MCCH message in the MBMS configuration information message to the user. When the MBMS configuration information changes, the RNCs send the MCCH message in the changed MBMS configuration information message to the user within the modification period. In order to guarantee the synchronous transmission of the MBMS configuration information between the master RNC and each slave RNC, the synchronization of the scheduling period between the master RNC and each slave RNC should be firstly guaranteed.

In each RNC, time is measured by using an SFN number. The SFN represents a time within an RNC. As long as SFN numbers of the master RNC and each slave RNC are aligned, the initial position alignment of the scheduling period within each RNC can be achieved. The initial SFN number of the scheduling period satisfies the condition that SFN mod 2(m−r)=0, where m denotes a modification period coefficient and r denotes a repetition period coefficient. Once the repetition period and the modification period are determined, m and r can be determined correspondingly and the initial SFN of the scheduling period is also determined. In this way, the initial position alignment of the scheduling period within each RNC can be implemented by aligning the SFN numbers of the master RNC and each slave RNC. Afterwards, the SFN numbers between the master RNC and each slave RNC need to be synchronized. The SFN number alignment of the master RNC and each slave RNC can be implemented by adding a GPS clock on the master RNC and each slave RNC. The synchronization of a modification period and an access period of each RNC can be implemented by using the same method. In this way, the master RNC and each slave RNC can keep synchronous in sending the MBMS configuration information.

If the configuration information changes, the RNCs send the changed MBMS configuration information message to the user at the start of the modification period of a next scheduling period.

Because the MBMS configuration information message of the MBMS is transferred between the master RNC and the slave RNCs through IUR interfaces, more IUR interfaces may be required when the number of the slave RNCs is large. In order to reduce the number of the IUR interfaces, an IP multicasting mode can be employed to implement the transfer of the MBMS configuration information message of the MBMS between the master and slave RNCs. The IP multicasting transmits an IP packet to a set of hosts of a multicast group according to a specific IP multicasting address based on a maximum delivery principle. The basic method is as follows. When someone sends data to a group of persons, he does not need to send the data to each person and only needs to send the data to a specific reserved multicast address, and all the persons joining the group can receive the data. Accordingly, the sender only needs to send the data for once to send the data to all the receivers, which significantly reduces the network load and the burden of the sender. In the embodiments of the present invention, an IP multicasting address is configured for the RNCs in the SFN area, the multicasting function is performed by an IP layer multicast module of the master RNC, and the MBMS configuration information message is sent to the multicast address. With such multicast implementation, the master RNC can send the MBMS configuration information message to each slave RNC by using one IUR interface.

Because the configuration information is generated by the master RNC, the master RNC designates the mapping relationship between the MBMS services and the S-CCPCHs, and notifies each slave RNC. In this way, the consistency of the correspondence between the MBMS services and the S-CCPCHs within the MBSFN can be guaranteed.

In conclusion, the above are merely preferred embodiments of the present invention. However, the scope of the present invention is not limited thereto. Changes or replacements readily apparent to persons skilled in the prior art within the technical scope of the present invention should fall within the scope of the present invention. Therefore, the protection scope of the present invention is subject to the appended claims.

What is claimed is:

1. A method for configuring multicast broadcast single frequency network (MBSFN) resources, wherein the MBSFN comprises at least two radio network controllers (RNCs), the method comprising:
   serving, by one of the at least two RNCs, as a master RNC, and serving, by other RNC or RNCs, as a slave RNC;
   generating, by the master RNC, a multimedia broadcast multicast service (MBMS) configuration information message; and
   sending, by the master RNC, the MBMS configuration information message to the slave RNC.

2. The method according to claim 1, wherein the MBMS configuration information message comprises: point-to-multipoint control channel configuration information and a message to be transferred on the point-to-multipoint control channel.

3. The method according to claim 1, wherein after the generating, by the master RNC, the MBMS configuration information message, the method further comprises:
   assigning a multicast address to the slave RNC; and
   the sending, by the master RNC, the MBMS configuration information message to the slave RNC further comprises:
   sending, by the master RNC, the MBMS configuration information message to the slave RNC in a multicast mode according to the multicast address.

4. The method according to claim 1, wherein after the generating, by the master RNC, the MBMS configuration information message, the method further comprises:
   encoding, by the master RNC, the configuration information message; and
   the sending, by the master RNC, the MBMS configuration information message to the slave RNCs further comprises:
   sending, by the master RNC, the MBMS configuration information message to the slave RNCs in a form of data stream.

5. The method according to claim 1, further comprising:
   synchronizing initial timing of scheduling periods of the master RNC and the slave RNC.

6. The method according to claim 5, wherein
   each of the scheduling periods comprises a repetition period and a modification period.

7. The method according to claim 1, wherein after the sending, by the master RNC, the MBMS configuration information message to the slave RNCs, the method further comprises:
   receiving, by the slave RNCs, the MBMS configuration information message;
   decoding, by the slave RNC, the MBMS configuration information message; and
   establishing, by the slave RNC, a point-to-multipoint control channel according to the MBMS configuration information message.

8. A master radio network controller (RNC) device, comprising:
   RNC hardware configured to execute functions as:
      a configuration information message generating module, configured to generate a multimedia broadcast multicast service (MBMS) configuration information message; and
      a master sending module, configured to send the MBMS configuration information message to a slave RNC.

9. The master RNC device according to claim 8, the RNC hardware further configured to execute a function as:
   a synchronization module, configured to synchronize initial timing of scheduling periods of the master RNC and the slave RNC.

10. The master RNC device according to claim 8, the RNC hardware further configured to execute a function as:
    an encoding module, configured to encode the MBMS configuration information message generated by the configuration information message generating module; wherein
    the master sending module is configured to send the MBMS configuration information message encoded by the encoding module to the slave RNC.

11. A slave radio network controller (RNC) device, comprising:
    RNC hardware configured to execute functions as:
       a receiving module, configured to receive a multimedia broadcast multicast service (MBMS) configuration information message generated and sent by a master RNC; and
       a control channel establishing module, configured to establish a point-to-multipoint control channel according to the MBMS configuration information message.

12. The slave RNC device according to claim 11, the RNC hardware further configured to execute a function as:
    a synchronization module, configured to synchronize initial timing of scheduling periods of the master RNC and the slave RNC.

13. The slave RNC device according to claim 11, the RNC hardware further configured to execute a function as:
    a decoding module, configured to decode the MBMS configuration information message received by the receiving module; wherein
    the control channel establishing module is configured to establish the point-to-multipoint control channel according to the MBMS configuration information message decoded by the decoding module.

* * * * *